(12) United States Patent
Baumann et al.

(10) Patent No.: US 6,970,619 B2
(45) Date of Patent: Nov. 29, 2005

(54) MECHANICALLY TUNABLE OPTICAL DEVICES SUCH AS INTERFEROMETERS

(75) Inventors: Frieder H. Baumann, Red Bank, NJ (US); Mihaela Dinu, Freehold, NJ (US); Howard R. Stuart, Red Bank, NJ (US); James A. Walker, Howell Township Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 63 days.

(21) Appl. No.: 10/403,872

(22) Filed: Mar. 31, 2003

(65) Prior Publication Data

US 2005/0074209 A1 Apr. 7, 2005

Related U.S. Application Data

(63) Continuation-in-part of application No. 09/861,840, filed on May 21, 2001, now Pat. No. 6,751,377.

(51) Int. Cl.$^7$ ............................................... G02B 6/26
(52) U.S. Cl. .............................. 385/25; 385/16; 385/9; 372/92
(58) Field of Search .............................. 385/25, 16, 15, 385/14, 9, 8, 13, 2, 3, 4, 100; 372/92, 43

(56) References Cited

U.S. PATENT DOCUMENTS

| 5,905,573 | A |   | 5/1999 | Stallard et al. ............. 356/519 |
| 5,926,496 | A | * | 7/1999 | Ho et al. ...................... 372/92 |
| 6,009,115 | A | * | 12/1999 | Ho .............................. 372/92 |
| 6,195,187 | B1 |   | 2/2001 | Soref et al. .................. 359/114 |
| 6,473,541 | B1 | * | 10/2002 | Ho .............................. 385/15 |
| 6,510,259 | B1 |   | 1/2003 | Al-hemyari .................. 385/16 |
| 6,668,111 | B2 | * | 12/2003 | Tapalian et al. .............. 385/28 |
| 6,728,279 | B1 | * | 4/2004 | Sarlet et al. .................. 372/43 |

OTHER PUBLICATIONS

Hagness et al., 'FDTD Microcavity simulations: design and experimental realization of waveguide–coupled single–mode ring and whispering–gallery–mode disk resonators, Journal of lightw. tech., vol. 15, No. 11, Nov. 1997.*

"Effect of two–proton absorption on all–optical guided–wave devices", K.W. DeLong et al., 1989 American Institute of Physics, Appl. Phys. Lett. 55 (18), Oct. 30, 1989, pp. 1823–1825.

"Optical Filter Design and Analysis", Christi K. Madsen and Jian H. Zhao, 1999, John Wiley & Sons, Inc., pp. 68–77.

FDTD Microcavity Simulations: Design and Experimental Realization of Waveguide–Coupled Single–Mode Ring an Whispering–Gallery–Mode Disk Resonators, S.C. Hagness et al., Journal of Lightwave Technology, vol. 15, No. 11, Nov. 1997, pp. 2154–2165.

"Beyond the absorption–limited nonlinear phase shift with microring resonators", Steve Blair et al., Mar. 1, 2002, vol. 27, No. 5, Optics Letters; 2002 Optical Society of America, pp. 357–359.

* cited by examiner

*Primary Examiner*—Kianni Kaveh

(57) ABSTRACT

An optical device has at least one waveguide with at least one adjacent resonator, where the distance between the resonator and the waveguide can be controllably adjusted to change the optical coupling between the resonator and the waveguide. When implemented as part of an interferometer, the ability to adjust the waveguide/resonator distance—and thereby the optical coupling between them—provides a mechanically tunable interferometer.

21 Claims, 5 Drawing Sheets

MECHANICALLY TUNABLE OPTICAL DEVICES SUCH AS INTERFEROMETERS

CROSS-REFERENCE TO RELATED APPLICATIONS

This is a continuation-in-part of application Ser. No. 09/861,840, filed on May 21, 2001 now U.S. Pat. No. 6,751,377, the teachings of which are incorporated herein by reference.

BACKGROUND OF THE INVENTION

1. Field of the Invention

The invention relates to optical devices used, for example, in communication systems, and, in particular, to interferometers, such as Mach-Zehnder interferometers.

2. Description of the Related Art

As data rates in optical networks increase, electronics-based switching becomes ever more challenging. For instance, detection schemes relying on optical demultiplexing followed by processing at lower data rates may be inevitable at data rates of 160 Gb/s or higher. As opposed to electronic or micro-electro-mechanical systems (MEMS)-based switching or routing, all-optical switching or data processing based on non-linear optical interactions offers the intrinsic double advantage of transparency and ultra-fast processing speeds. The speed in all-optical data processing is limited only by the response time of the relevant optical non-linearity (typically in the 100 s of THz range).

However, the small magnitude of useful non-linearities in most materials implies high switching power levels or long interaction lengths, which constitutes a challenge for the practical implementation of all-optical non-linear devices. Another issue is the fact that useful (refractive) non-linearities are usually accompanied by a deleterious absorptive component.

SUMMARY OF THE INVENTION

Problems in the prior art are addressed in accordance with the principles of the invention by providing an optical waveguide with an adjacent optical resonator, where the distance between the waveguide and the resonator can be controllably adjusted to change the optical coupling between the waveguide and resonator. Such a combination of waveguide and resonator can be implemented in the context of different types of optical devices. In one embodiment, the waveguide/resonator combination forms part of a mechanically tunable interferometer.

BRIEF DESCRIPTION OF THE DRAWINGS

Other aspects, features, and advantages of the invention will become more fully apparent from the following detailed description, the appended claims, and the accompanying drawings in which like reference numerals identify similar or identical elements.

FIG. 6 also shows the incident intensity $I_{inc}$ of light into the waveguide at which the effective figure of merit $FOM_{eff}$ reaches a value of 1.

DETAILED DESCRIPTION

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments.

Add-drop Filters

Optical communication systems are beginning to achieve their great potential for the rapid transmission of vast amounts of information. In essence, an optical communication system comprises a source of light, a modulator for impressing information on the light to produce optical signals, an optical fiber transmission line for carrying the optical signals, and a receiver for detecting the signals and demodulating the information they carry. Increasingly, the optical signals are wavelength division multiplexed signals (WDM signals) comprising a plurality of distinct wavelength signal channels.

Add/drop devices are important components of WDM optical communication systems. Such devices are typically disposed at various intermediate points along the transmission fiber (called nodes) to permit adding or dropping of signal channels at the nodes. Thus, for illustration, an add/drop device would permit a transmission line between New York and Los Angeles to drop off at Chicago signal channels intended for Chicago and to add at Chicago signal channels for New York and Los Angeles. As the number of nodes increases, the number of add/drop devices increases, and their cost and effect on the system become appreciable.

Figure 1:
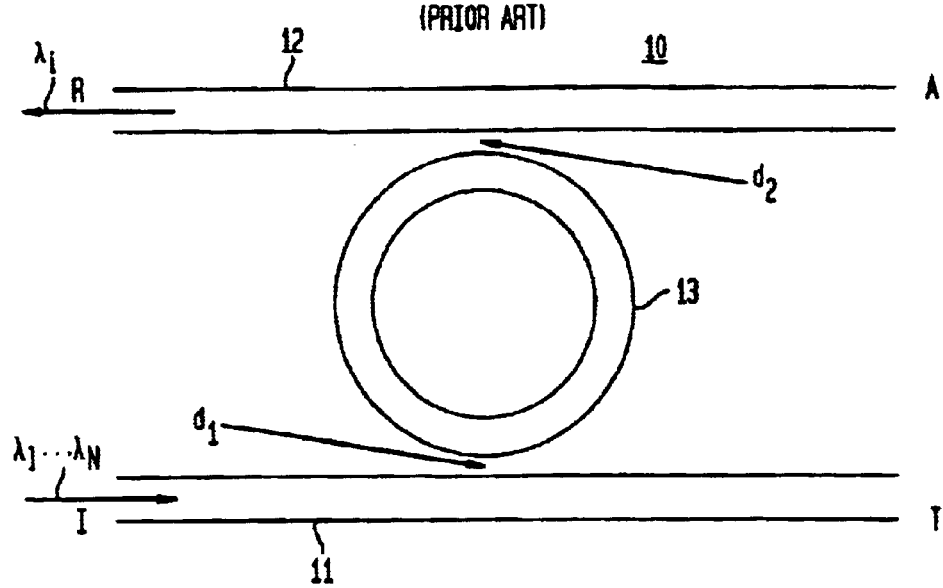
FIG. 1 schematically illustrates a prior art micro-ring optical add-drop filter.

FIG. 1 schematically illustrates a prior art micro-ring optical add-drop filter 10 known as a micro-ring add-drop filter. Filter 10 comprises, in essence, a pair of optical waveguides 11 and 12 optically coupled by a micro-scale resonator 13 comprising a waveguide ring closely adjacent each of waveguides 11, 12. Ring 13 is optically resonant for optical wavelengths $\lambda_i$ such that $n\lambda_i=C$, where C is the circumference of the ring and n is an integer.

In operation, if a set of wavelengths $\lambda_1, \lambda_2, \ldots, \lambda_N$ is incident on input port I of waveguide 11, any of the wavelengths resonant with the micro-ring resonator will couple across resonator 13 to waveguide 12 and exit filter 10 at drop port R. Nonresonant wavelengths will pass the ring structure unperturbed and exit filter 10 at the through port T. In addition, resonant wavelengths can be added at the add port A and will exit at port T.

The diameter D of the ring is chosen sufficiently small to obtain a desired free spectral range. To obtain a free spectral range of the order of tens of nanometers, D must be less than about 10 micrometers. With such small diameters, the index contrast between the ring and its cladding (the lateral index contrast) must be high to avoid bending losses. Typically, the rings are fabricated with air cladding in the lateral direction.

In view of the high lateral index contrast, the coupling distances $d_1$ and $d_2$ between ring 13 and waveguides 11, 12, respectively, must be small—typically less than 300 nanometers in order to obtain the necessary coupling. In alternative embodiments, micro-ring resonator 13 can be replaced by a micro-disk resonating in whispering gallery modes. Further details concerning the structure and operation of prior art micro-ring and micro-disk add-drop filters are set forth in B. E. Little, et al., "Microring Resonator Channel Dropping Filters", 15 *Journal of Lightwave Technology* 998 (1997); B. E. Little, et al., "Ultracompact Si—SiO$_2$ Microring Resonator Optical Channel Dropping Filters, 10 *IEEE Photonics Technology Letters* 549 (1998); and D. Radfizadeh, et al., "Wave-Guide-Coupled AlGaAs/GaAs Microcavity Ring and Disk Resonators . . . ", 22 *Optics Letters* 1244 (1997), each of which is incorporated herein by reference.

While theoretically promising, micro-ring and micro-disk add-drop filters are difficult to fabricate with necessary precision. For example, a good quality add-drop filter will essentially eliminate a dropped wavelength so that it does not reach the port T. (The filter achieves a high extinction ratio for the dropped wavelength.) This elimination involves precise control of the coupling distances $d_1$, $d_2$. Due to their small sizes (less than 300 nm), these distances are difficult to fabricate with the necessary precision. Published results to date have shown only slightly better than 10 dB extinction for the best individual devices.

Another challenge in fabrication is to make micro-rings or micro-disks with precise resonant frequencies. An add-drop filter for telecommunications would need rings or disks with diameters specified and fabricated to better than 1 part in 1500 in order to overlap a dense WDM grid (100-GHz spacing). Moreover, sidewall roughness of the ring adds a further degree of uncertainty to the precise value of the diameter.

Finally, it should be noted that the prior art micro-ring and micro-disk add-drop filters are fixed in configuration. Once fabricated, the filter will always add and drop the same respective wavelengths. However, in contemplated systems, it would be highly advantageous if add-drop filters could be dynamically reconfigured to select and change which wavelength channels are added and dropped.

In accordance with one embodiment of the invention, a tunable, reconfigurable optical add-drop filter comprises a pair of optical waveguides optically coupled by a (micro-ring or micro-disk) resonator wherein the coupling distance between the resonator and at least one of the waveguides is mechanically controllable. With this arrangement, the degree of coupling can be tuned after fabrication to provide high-level extinction of dropped wavelengths and the filter can be dynamically reconfigured. Advantageously, laser radiation is provided to tune the resonant wavelength.

Figure 2:
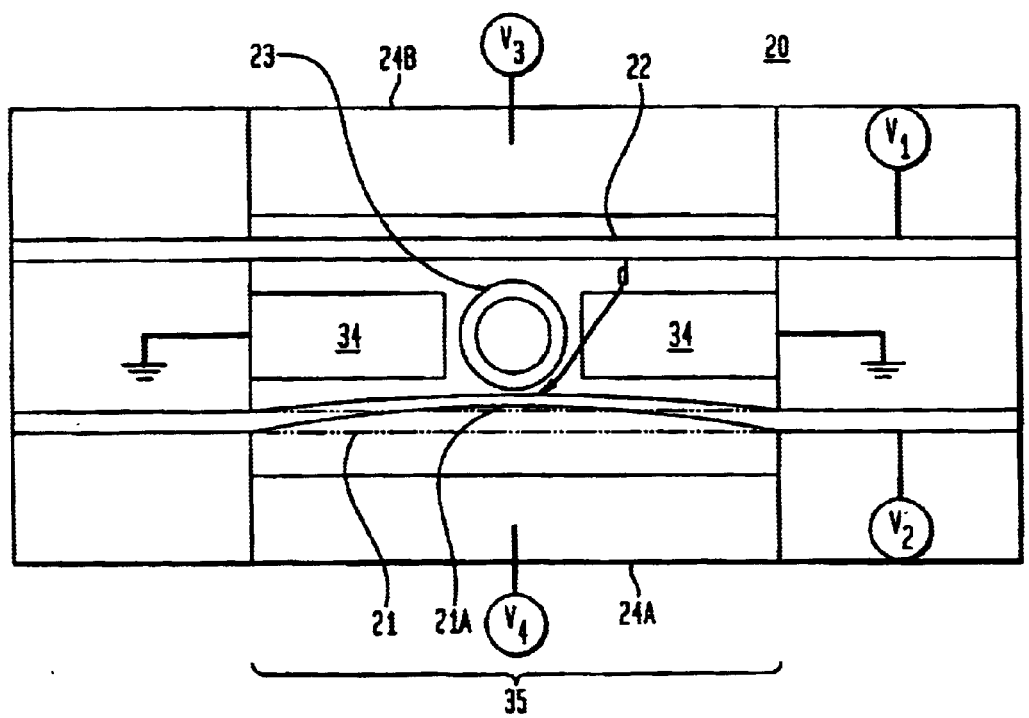
FIG. 2 is a schematic top view of an exemplary tunable, reconfigurable optical add-drop filter, according to one embodiment of the present invention.

FIG. 2 is a schematic top view of a tunable, reconfigurable optical add-drop filter 20 comprising a pair of locally non-intersecting optical waveguides 21, 22 having an optical resonator 23 (here a micro-ring resonator) disposed between them. At least one of the waveguides, e.g., 21, is micromechanically movable toward or away from resonator 23 to control the optical coupling distance d between the waveguide and resonator 23. One or more actuating electrodes 24A, 24B can be provided to move waveguides 21, 22 toward or away from resonator 23.

Figure 3:
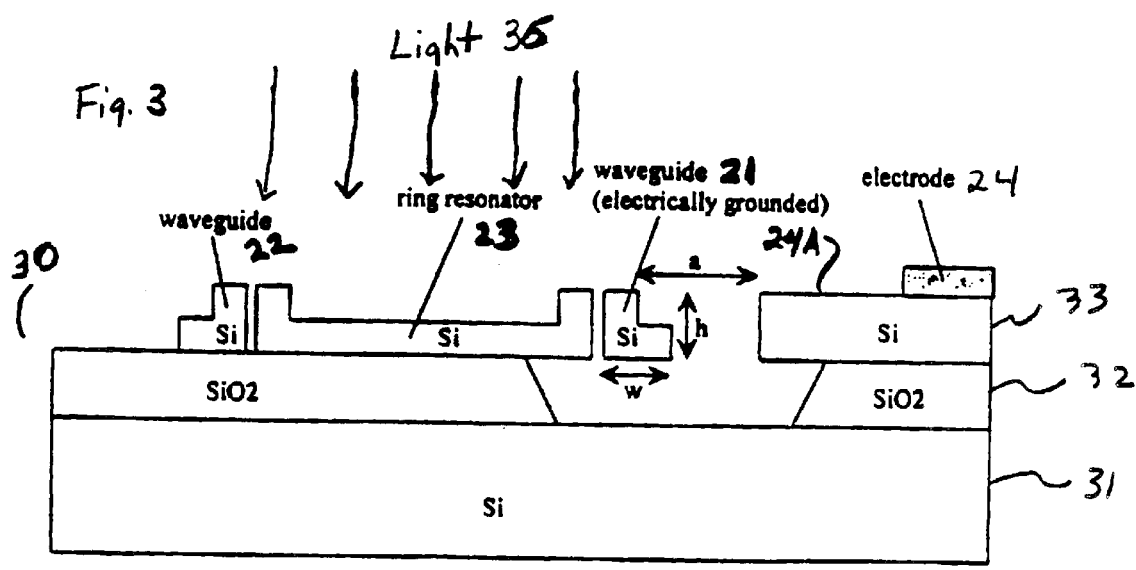
FIG. 3 is a schematic cross section of the filter of FIG. 2.

FIG. 3 is a schematic cross section of filter 20 of FIG. 2. Waveguide 21, resonator 23, and waveguide 22 are advantageously low-loss rib waveguides (single mode or multimode). They can be conveniently formed on a silicon-on-insulator workpiece 30 comprising a base layer 31 of silicon, a middle insulating layer 32 comprising several micrometers of SiO$_2$, and a top layer 33 comprising several micrometers of single-crystal silicon. The waveguides, resonator, and actuating electrodes are preferably formed in top layer 33 using techniques well known in the art. The top silicon layer 33 possesses good mechanical properties, and the underlying oxide layer 32 can function as a sacrificial layer for releasing the mechanically active region 35. See, for example, R. A. Soref, et al., "Large single-mode rib waveguides in GeSi—Si and Si-on-SiO$_2$," 27 *IEEE J. Quant. Elec.* 1971 (1991) and B. Jalali, et al., "Guided-Wave Optics In Silicon-on-Insulator Technology," 143 *IEEE Proceedings-Optoelectronics* 307 (1996), which are incorporated herein by reference. In this embodiment, the resonator and electrodes are rigidly connected to the substrate and therefore to each other, while the mechanically active region is able to move relative to the resonator and electrodes.

The device can be fabricated with the initial waveguide-resonator spacing $d_0$ at a larger value than the spacing required for coupling (e.g., $d_0$=0.5 micrometer). In this manner, the device can be made using optical lithography with relatively loose tolerances on the precise value of $d_0$. Referring back to FIG. 2, the central strips of silicon 34 surrounding resonator 23 are electrically grounded, and different voltages ($V_1$ and $V_2$) can be applied to the two waveguides, drawing them towards the resonator. Waveguide 21 in a position drawn toward the resonator is shown as 21A. The coupling can be adjusted independently for the two waveguides 21, 22, permitting optimization of throughput extinction. In addition, separate voltages ($V_3$ and $V_4$) can be applied to the outlying electrodes 24A and 24B to pull the waveguides away from the resonator and completely shut off the coupling.

The precise shape and dimensions of the waveguides and the ring will depend upon the optical and mechanical design constraints. The relative shapes and aspect ratios shown in FIG. 2 are merely illustrative and do not necessarily reflect what the final device would look like. The dimensions of the top two layers will typically be on the order of one to several microns, and the spacing between the waveguide and the ring will typically be less than about 300 nm. The optical constraint is that the distance a in FIG. 3 should be large enough to allow for "shutting off" the interaction. Motion is obtained by electrostatic actuation: waveguide 21 can be electrically grounded (at a point adjacent to the mechanically active region) and a voltage is applied to the Si layer pictured to the right of the released waveguide in FIG. 3. The waveguide will move away from the resonator. For lower drive voltages, smaller w, larger h, and smaller a are preferred. The mechanically active region 35 will typically extend beyond the waveguide-resonator interaction region by ten to several tens of microns to allow for a wide bending length. Outside this region, the waveguide will be anchored on the SiO$_2$ underlayer 32. Adiabatic tapering can be used to modify the waveguide parameters and to allow for good coupling to an optical fiber.

Advantageously, radiation 36 from a laser (not shown) can be shone selectively on ring resonator 23 to tune the resonant wavelength. The radiation provides tuning by increasing the temperature of the resonator and increasing the density of charge carriers in the resonator. The wavelength of the radiation is preferably less than 1 micrometer and typically 0.85 micrometer.

To illustrate the feasibility of this design, the voltage required to move the waveguide can be calculated. For simplicity, consider a waveguide with a rectangular cross-section, and assume w=1 micron and h=3 microns. Also assume the length l of the mechanically released section of the waveguide to be l=40 microns. The displacement δ of a beam of length l anchored on both ends can be written according to Equation (1) as follows:

$$\delta = \frac{5ql^4}{384EI},\qquad(1)$$

where q is the force per unit length applied to the beam (the force is uniform across the whole beam), I is the moment of inertia of the beam cross-section, and E is Young's modulus. The force per unit length, q, generated on the beam by applying a voltage V can be written according to Equation (2) as follows:

$$q = \frac{\varepsilon_o h V^2}{2d^2},\qquad(2)$$

where $\varepsilon_o$ is the permittivity of free space, and d is the separation between the two surfaces defining the capacitor. Assuming an initial (as fabricated) separation a=1 micron, the voltage required to displace the beam by 0.5 micron is calculated to be V=57.6 volts. Current MEMS devices routinely operate at tens of volts, so this value is feasible. The L-shaped waveguide pictured in FIG. 3 will have a larger moment of inertia than was assumed for this calculation, but the larger moment can be compensated by increasing the length l of the mechanically released section.

Figure 4:
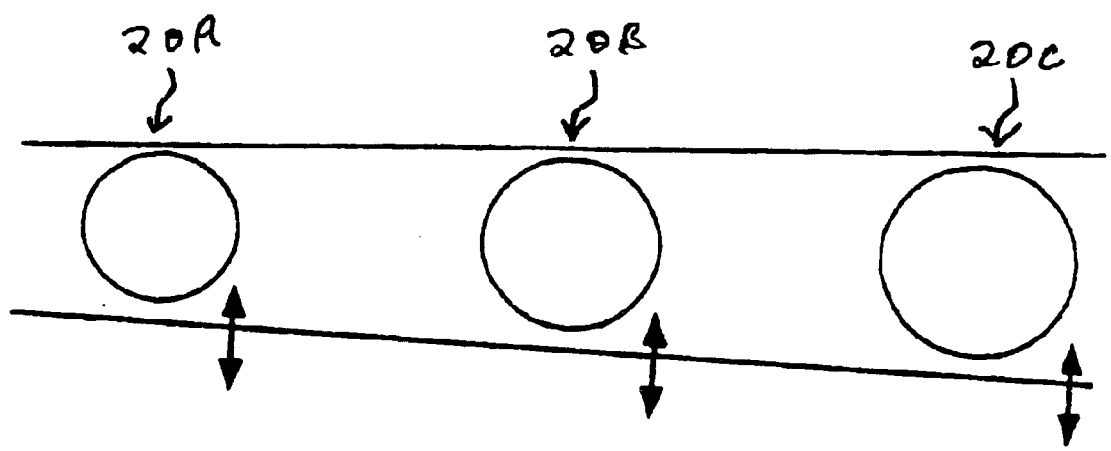
FIG. 4 is a schematic top view of a multi-wavelength reconfigurable add-drop filter, according to another embodiment of the present invention.

FIG. 4 is a schematic top view of a multi-wavelength reconfigurable add-drop filter 40 formed by cascading a plurality of tunable, reconfigurable add-drop filters 20A, 20B, 20C, with resonator stages independently addressable with actuating electrodes (not shown for simplicity). As many wavelengths as desired can thus be added or dropped.
Interferometers Choosing a material for non-linear optical switching typically involves a tradeoff between having a sufficiently large optical non-linearity and having sufficiently low absorption at the operating wavelength. This tradeoff is often described in terms of the non-linear figure of merit T of the material as given in Equation (3) as follows:

$$T = \frac{2\beta\lambda}{n_2},\qquad(3)$$

where β is the two-photon absorption, $n_2$ is the Kerr coefficient, and λ is the wavelength in vacuum. In all-optical switching applications, a non-linear figure of merit of T<1 is desirable. See K. W. DeLong, K. B. Rochford, and G. I. Stegeman, "Effect of two-photon absorption on all-optical guided devices," Appl. Phys. Lett. 55, P. 1823 (1989), the teachings of which are incorporated herein by reference.

Unfortunately, few materials simultaneously exhibit a large Kerr coefficient $n_2$, a good non-linear figure of merit T, and properties favorable for device fabrication. Recently, micro-ring/micro-disk optical resonators coupled to optical waveguides have been proposed as a means of improving the effective non-linear figures of merit $FOM_{eff}$ of a material. See S. Blair, J. E. Hebner, and R. W. Boyd, "Beyond the absorption-limited nonlinear phase shift with microring resonators," Opt. Lett. 27, p. 357 (2002) ("the Blair paper"), the teachings of which are incorporated herein by reference.

$FOM_{eff}$ is different from the bulk or intrinsic figure of merit T in that it attempts to describe the quality of the non-linear interaction within a particular device geometry, rather than the intrinsic quality of the material. For a device having a waveguide arm, $FOM_{eff}$ may be defined as the total non-linear phase shift within the device normalized to the device transmission according to Equation (4) as follows:

$$FOM_{eff} = \frac{e}{\pi}(\Delta\phi)T_{tot},\qquad(4)$$

where $T_{tot}$ is the waveguide transmission and Δϕ is the non-linear phase change in the waveguide arm. For efficient non-linear all-optical applications such as non-linear directional couplers and all-optical switching, the effective non-linear figure of merit $FOM_{eff}$ should be greater than 1.

Note that, as expressed in Equations (3) and (4), the effective non-linear figure of merit $FOM_{eff}$ of Equation (4) has a dependence on non-linear absorption and refraction that is the inverse of the dependence of the intrinsic non-linear figure of merit T of Equation (3). In particular, the intrinsic non-linear figure of merit T increases as non-linear absorption (β in Equation (3)) increases (or as non-linear phase shift decreases), while the effective non-linear figure of merit $FOM_{eff}$ increases as non-linear phase shift (Δϕ in Equation (4)) increases (or as non-linear absorption decreases).

As shown theoretically in the Blair paper, the effective non-linear figure of merit $FOM_{eff}$ can be enhanced using resonant coupling between optical waveguides and micro-ring resonator structures. While resonant effects have been used to enhance the non-linear properties of constituent materials or to tailor the temporal response of devices, resonant interaction cannot change the intrinsic figure of merit T of a particular material.

However, in coupled waveguide/resonator geometries, the effective figure of merit $FOM_{eff}$ will be enhanced when the coupling between the waveguide and the resonator is properly established. This is significant in that it allows materials with marginal intrinsic figure of merit T to be used in all-optical (e.g., switching) applications. However, a major obstacle towards practical implementation of such devices is the ability to tune the coupling between the waveguide and the resonator.

As described further later in this specification, the effective non-linear figure of merit $FOM_{eff}$ is strongly dependent on the coupling between a waveguide and a resonator. In practice, it may be difficult to achieve optimum coupling conditions. According to certain embodiments of the present invention, micro-mechanically movable waveguides are used to tune the waveguide/micro-ring coupling and thereby realize practical devices (i.e., devices fabricated using materials having marginal intrinsic figure of merit) with resonantly enhanced, effective non-linear figures of merit.

Figure 5:
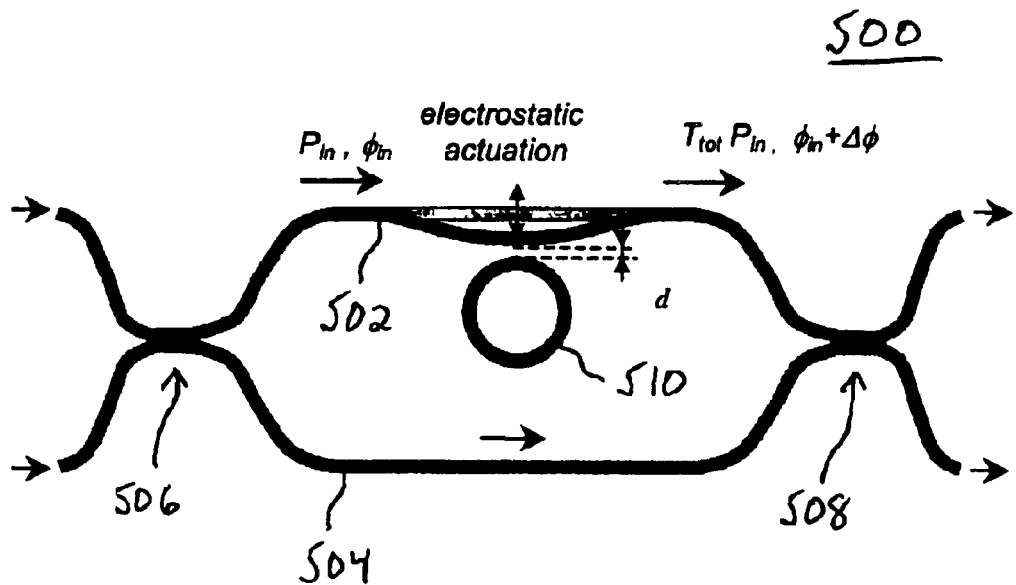
FIG. 5 shows a schematic representation of a Mach-Zehnder-type interferometer, according to yet another embodiment of the present invention.

FIG. 5 shows a schematic representation of a Mach-Zehnder-type interferometer 500, according to one embodiment of the present invention. Interferometer 500 has two waveguide arms 502 and 504 connecting input and output couplers 506 and 508. Adjacent waveguide arm 502 is a micro-ring resonator 510. Waveguide arm 502 and resonator 510 have a configuration similar to that shown in FIGS. 2 and 3 for waveguide 21 and resonator 23 excluding the presence of waveguide 22).

As such, waveguide arm 502 is adapted to flex in either of the directions indicated by the double arrow in FIG. 5 when the electrostatic potential difference between waveguide arm 502 and one or more stationary electrodes (not shown in FIG. 5, but similar to electrodes 34 of FIGS. 2 and 3) is changed, resulting in a change in the distance d between waveguide arm 502 and the closest portion of stationary resonator 510. In particular, when the magnitude of the electrostatic potential difference between waveguide arm 502 and the electrode(s) increases, the distance d decreases, and the distance d increases, when the magnitude of the electrostatic potential difference decreases. In one possible implementation, waveguide arm 502 is grounded and a non-zero voltage is applied to the electrodes. Alternatively, the electrodes could be grounded with a non-zero voltage being applied to waveguide arm 502. Note that, in FIG. 5, the dimensions of the structures and the waveguide/micro-ring gap distance d are not to scale, and the waveguide displacement is exaggerated for purposes of explanation.

The optical coupling between waveguide arm 502 and resonator 510 is a function of the distance d. In particular, the exponential dependence on the distance d of the coupling constant σ of the electric field of light propagating along waveguide arm 502 into resonator 510 can be approximated by Equation (5) as follows:

$$\sigma \approx \sin[\kappa_0 \sqrt{2\pi R d_0} \exp(-d/d_0)], \quad (5)$$

where R is the micro-ring radius of resonator 510, and the design of waveguide arm 502 is described by the parameters $d_0$ and $\kappa_0$, which in general are calculated numerically. See C. K. Madsen and J. J. Zhao, "Optical Filter Design and Analysis," p. 75, Wiley, N.Y. (1999), the teachings of which are incorporated herein by reference.

Figure 6:
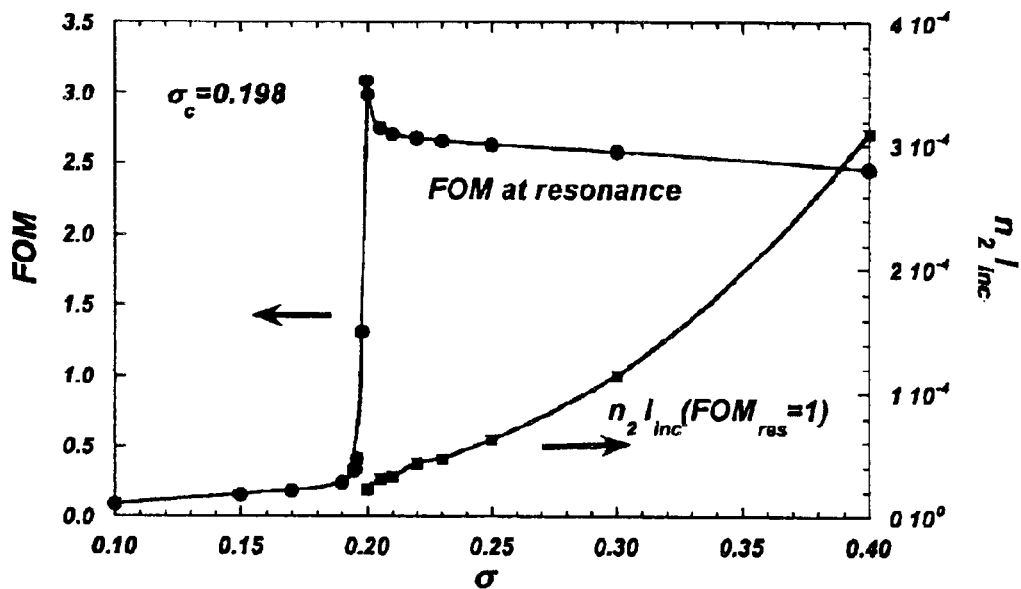
FIG. 6 shows a graphical representation of the effective figure of merit $FOM_{eff}$ in a micro-ring-coupled waveguide as a function of the coupling constant σ.

Non-linear interaction with micro-ring resonator 510 modifies the amplitude and the phase of the light propagating along waveguide arm 502 with respect to the linear case. FIG. 6 shows a graphical representation of the effective figure of merit $FOM_{eff}$ in a micro-ring-coupled waveguide as a function of the coupling constant σ. FIG. 6 also shows the incident intensity $I_{inc}$ of light into the waveguide at which the effective figure of merit $FOM_{eff}$ reaches a value of 1. These simulations assumed a micro-ring resonator of 16-micron diameter with an intrinsic figure of merit T of 2.5.

As indicated in FIG. 6, near the critical-coupling condition, where the electric-field coupling constant σ into the micro-ring is equal to the micro-ring round-trip loss, the intensity-dependent, effective figure of merit $FOM_{eff}$ exhibits a pronounced dependence on the coupling constant σ, ranging from values near 0.2 for the slightly under-coupled condition to values near 2.7 for over-coupled conditions, and as high as 3.08 for the slightly over-coupled condition. A desirable situation is that of over-coupling, where the effective figure of merit $FOM_{eff}$ is fairly constant and larger than 1.

Also indicated in FIG. 6 is the incident intensity of light into the waveguide for which the effective figure of merit $FOM_{eff}$ becomes larger than 1. High, required peak powers are a severe limitation for all-optical switching. Therefore, it is desirable to operate in a coupling condition where the intensity requirement is minimal, i.e., close to the critical coupling condition. Since the coupling depends in a non-linear manner on the waveguide/resonator gap d, this constraint implies extremely stringent fabrication requirements, which are difficult to satisfy in practice.

As such, the ability to tune the coupling by adjusting the waveguide/resonator gap enables practical implementation of resonantly enhanced, non-linear all-optical devices based on micro-ring-coupled waveguides. To give an example, typical gap distances d for silicon and GaAs micro-ring-coupled waveguides are about 200 nm, where the coupling constant changes from σ=0.158 to σ=0.178 for a gap change Δd of about 6–7 nm. Such precisions are difficult to achieve with current lithographic techniques, especially because the desired gap distance d critically depends on the scattering losses determine by post-lithographic etching.

Figure 7:
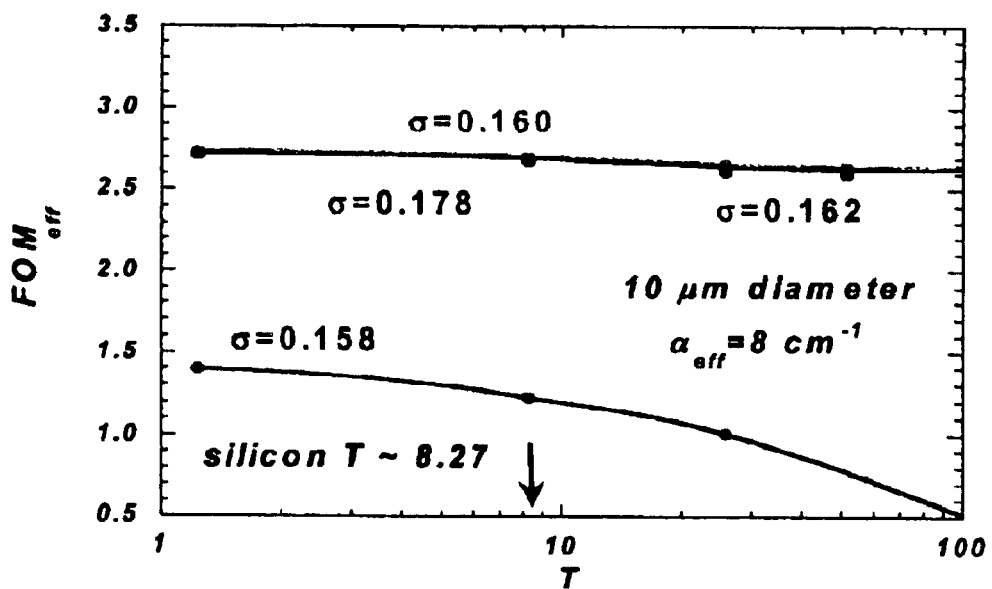
FIG. 7 shows a graphical representation of the dependence of the effective figure of merit $FOM_{eff}$ a waveguide on the intrinsic figure of merit T of the waveguide material for several values of the waveguide/micro-ring coupling constant σ.

FIG. 7 shows a graphical representation of the dependence of the effective figure of merit $FOM_{eff}$ of a waveguide on the intrinsic figure of merit T of the waveguide material for several values of the waveguide/micro-ring coupling constant σ. In this case, critical coupling occurs at $\sigma_c$=0.158. Resonant non-linear enhancement in the over-coupled region leads to large effective figures of merit, which are very weakly dependent on the intrinsic figure of merit of the material. The speed of the device is inversely proportional to the linewidth of the waveguide/micro-ring resonance, which for the micro-ring in FIG. 7 is about 25 GHz.

Figure 8:
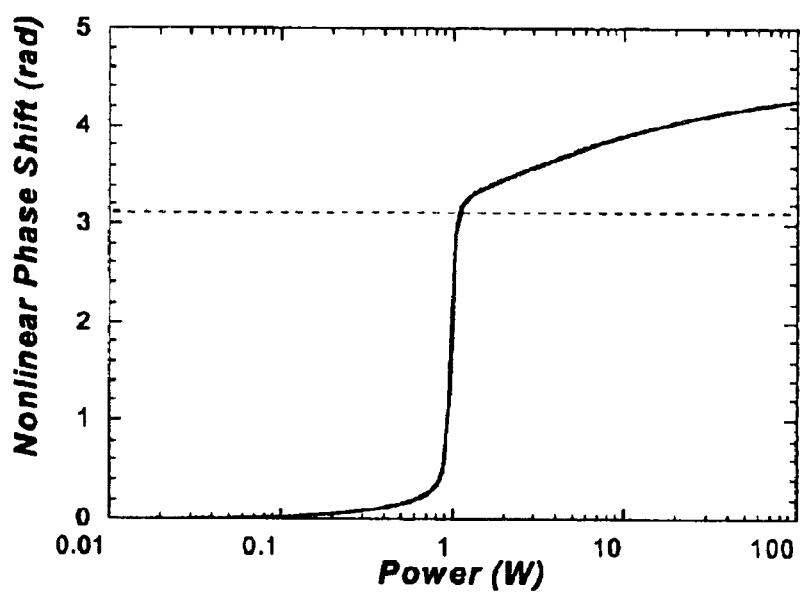
FIG. 8 shows a graphical representation of the non-linear phase shift for a silicon micro-ring-coupled waveguide as a function of the input power for a coupling constant σ=0.170.

FIG. 8 shows a graphical representation of the non-linear phase shift for a silicon micro-ring-coupled waveguide as a function of the input power for a coupling constant σ=0.170. The other parameters are the same as in FIG. 7. FIG. 8 illustrates the dramatic reduction in switching threshold due to resonance enhancement. As indicated in FIG. 8, a phase shift of π radians is achieved at a peak power P of about 1.10 W for a waveguide with an effective area $A_{eff}$ of 2 square microns. By contrast, in the case of a straight waveguide with the same cross section and length, the same phase shift would require a peak power of about 42 W. This translates into a dramatic reduction in switching power. Furthermore, in contrast to the straight waveguide, the transmission increases with increasing power, due to the loss of the resonance condition. For high enough powers, one can achieve close to 100% transmission and π phase shifts, conditions which are impossible to satisfy simultaneously in a straight waveguide in the same material system.

Thus, materials with a modest intrinsic figure of merit T, such as silicon, but which benefit from advantages such as low optical loss and advanced fabrication capabilities, can become attractive candidates for all-optical applications, such as switching, power limiting, all-optical regeneration, and wavelength conversion. The resonant enhancement enabling these devices is however critically dependent on the value of the coupling, which makes micro-mechanical tuning a highly advantageous component of resonantly enhanced, all-optical switching devices. As a result, interferometers, such as interferometer 500 of FIG. 5, exhibiting intensity-dependent phase shifts in one arm of the interferometer can be used in all-optical devices such as switches, power limiters, all-optical regenerators, and wavelength converters.

Interferometers of the present invention have been described in the context of Mach-Zehnder interferometer 500 of FIG. 5. The present invention is, however, not limited to such interferometers. In alternative interferometers embodiments, one or more of the following characteristics may apply. The interferometers could be any other type, not just Mach-Zehnder. The interferometer could have more than two waveguide arms. More than one waveguide arm could have one or more resonators (e.g., of different sizes) adjacent to it. Each resonator could move relative to an adjacent, stationary waveguide, or they both could be movable. The distance between each resonator and its adjacent waveguide could be controlled by a different mechanical mechanism including the use of a wide variety of suitable micro-electro-mechanical systems (MEMS) actuators. Each resonator could be a micro-ring, a micro-disk, or other suitable structure that couples optically with its adjacent waveguide, including those having a circular, oval, or other suitable shape. The interferometer could be fabricated using any suitable materials, including those based on silicon, GaAs, InP, glass, and any other suitable technologies.

Although the present invention has been described in the context of add-drop filters and interferometers, the invention is not so limited. In general, the present invention can be applied to any suitable type of optical device in which one or more resonators are disposed adjacent to one or more waveguides in such a way that it would be advantageous to be able to controllably adjust the distance between the resonator(s) and the waveguide(s), for example, to change the optical coupling between the resonator(s) and the waveguide(s). The present invention can be implemented in all-optical switches and other all-optical devices comprising a plurality of optical devices, each of which has one or more resonators adjacent to one or more waveguides where the distance(s) between the resonator(s) and the waveguide(s) is (are) mechanically controllable.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

We claim:

1. An optical device having one or more waveguides, the optical device comprising:
   a first waveguide; and
   a first resonator positioned adjacent to the first waveguide, wherein the distance between the first resonator and the first waveguide is adapted to be controllably adjusted to change the optical coupling between the first waveguide and the first resonator, wherein:
      the first waveguide is movable and the first resonator is stationary; and
      the first waveguide is adapted to move relative to the first resonator when an electrostatic potential difference is applied between the first waveguide and one or more stationary electrodes rigidly connected to the first resonator.

2. The optical device of claim 1, wherein the optical device is an interferometer comprising two or more waveguides including the first waveguide, wherein the distance between the first resonator and the first waveguide is adapted to be controllably adjusted to enable mechanical tuning of the optical performance of the interferometer.

3. The optical device of claim 2, wherein:
   the interferometer is a Mach-Zehnder interferometer having two waveguides; and
   the resonator is a ring or disk resonator.

4. The optical device of claim 2, wherein the interferometer is part of an all-optical switch.

5. The optical device of claim 4, wherein the all-optical switch comprises a plurality of the interferometers.

6. The optical device of claim 1, wherein the optical device is an all-optical switch.

7. The optical device of claim 1, wherein the optical device is part of an all-optical switch and the all-optical switch comprises a plurality of the optical devices.

8. The optical device of claim 1, wherein:
   the optical device is implemented on a substrate having the one or more stationary electrodes; and
   the first waveguide comprises a mechanically active region that is adapted to move relative to the substrate when the electrostatic potential difference is applied between the first waveguide and the one or more electrodes, wherein the motion of the first waveguide changes the distance between the first waveguide and the resonator.

9. The optical device of claim 8, wherein the substrate has first and second sets of one or more stationary electrodes disposed on the substrate such that:
   when an electrostatic potential difference is applied between the first waveguide and the first set of one or more electrodes, the distance between the first waveguide and the resonator tends to decrease; and
   when an electrostatic potential difference is applied between the first waveguide and the second set of one or more electrodes, the distance between the first waveguide and the resonator tends to increase.

10. The optical device of claim 1, wherein the optical device is fabricated using one or more materials having an intrinsic figure of merit T greater than one.

11. The optical device of claim 10, wherein the optical device has an effective figure of merit $FOM_{eff}$ greater than one.

12. The optical device of claim 1, wherein:
   the optical device is an interferometer comprising two or more waveguides including the first waveguide, wherein the distance between the first resonator and the first waveguide is adapted to be controllably adjusted to enable mechanical tuning of the optical performance of the interferometer;
   the interferometer is a Mach-Zehnder interferometer having two waveguides;
   the resonator is a ring or disk resonator;
   the interferometer is part of an all-optical switch comprising a plurality of the interferometers;
   the optical device is implemented on a substrate having the one or more stationary electrodes;
   the first waveguide comprises a mechanically active region that is adapted to move relative to the substrate when the electrostatic potential difference is applied between the first waveguide and the one or more electrodes, wherein the motion of the first waveguide changes the distance between the first waveguide and the resonator;
   the substrate has first and second sets of one or more stationary electrodes disposed on the substrate such that:
      when an electrostatic potential difference is applied between the first waveguide and the first set of one or more electrodes, the distance between the first waveguide and the resonator tends to decrease; and
      when an electrostatic potential difference is applied between the first waveguide and the second set of one or more electrodes, the distance between the first waveguide and the resonator tends to increase;
   the optical device is fabricated using one or more materials having an intrinsic figure of merit T greater than one; and
   the optical device has an effective figure of merit $FOM_{eff}$ greater than one.

13. The optical device of claim 1, further comprising a second waveguide, wherein:
   the first resonator is positioned between the first and second waveguides;

at a first selected distance between the first resonator and the first waveguide, light entering the first waveguide is substantially coupled from the first waveguide into the first resonator and then from the first resonator into the second waveguide; and at a second selected distance between the first resonator and the first waveguide, light entering the first waveguide is not substantially coupled from the first waveguide into the first resonator.

14. The optical device of claim 13, wherein the optical device is an add-drop filter.

15. The optical device of claim 13, further comprising one or more additional resonators positioned between the first and second waveguides, wherein the first and one or more additional resonators are adapted to resonate at different light frequencies.

16. The optical device of claim 1, further comprising a second waveguide, wherein:

the first resonator and the first and second waveguides form an interferometer;

at a first selected distance between the first resonator and the first waveguide, light entering the first waveguide substantially exists at a first output port of the interferometer; and at a second selected distance between the first resonator and the first waveguide, light entering the first waveguide substantially exists at a second output port of the interferometer.

17. An optical device having one or more waveguides, the optical device comprising:

a first waveguide; and a first resonator positioned adjacent to the first waveguide, wherein:

the distance between the first resonator and the first waveguide is adapted to be controllably adjusted to change the optical coupling between the first waveguide and the first resonator;

the optical device is an interferometer comprising two or more waveguides including the first waveguide;

the distance between the first resonator and the first waveguide is adapted to be controllably adjusted to enable mechanical tuning of the optical performance of the interferometer;

the interferometer is part of an all-optical switch; and the all-optical switch comprises a plurality of the interferometers.

18. An optical device having one or more waveguides, the optical device comprising:

a first waveguide; and a first resonator positioned adjacent to the first waveguide, wherein:

the distance between the first resonator and the first waveguide is adapted to be controllably adjusted to change the optical coupling between the first waveguide and the first resonator;

the optical device is implemented on a substrate having one or more stationary electrodes;

the first waveguide comprises a mechanically active region that is adapted to move relative to the substrate when an electrostatic potential difference is applied between the first waveguide and the one or more electrodes; and the motion of the first waveguide changes the distance between the first waveguide and the resonator.

19. The optical device of claim 18, wherein the substrate has first and second sets of one or more stationary electrodes disposed on the substrate such that:

when an electrostatic potential difference is applied between the first waveguide and the first set of one or more electrodes, the distance between the first waveguide and the resonator tends to decrease; and when an electrostatic potential difference is applied between the first waveguide and the second set of one or more electrodes, the distance between the first waveguide and the resonator tends to increase.

20. An optical device having one or more waveguides, the optical device comprising:

a first waveguide; and a first resonator positioned adjacent to the first waveguide, wherein:

the distance between the first resonator and the first waveguide is adapted to be controllably adjusted to change the optical coupling between the first waveguide and the first resonator; and the optical device is fabricated using one or more materials having an intrinsic figure of merit T greater than one.

21. The optical device of claim 20, wherein the optical device has an effective figure of merit $FOM_{eff}$ greater than one.

* * * * *